April 19, 1932. W. H. SILVER 1,854,231
LISTER CULTIVATOR
Filed July 24, 1931
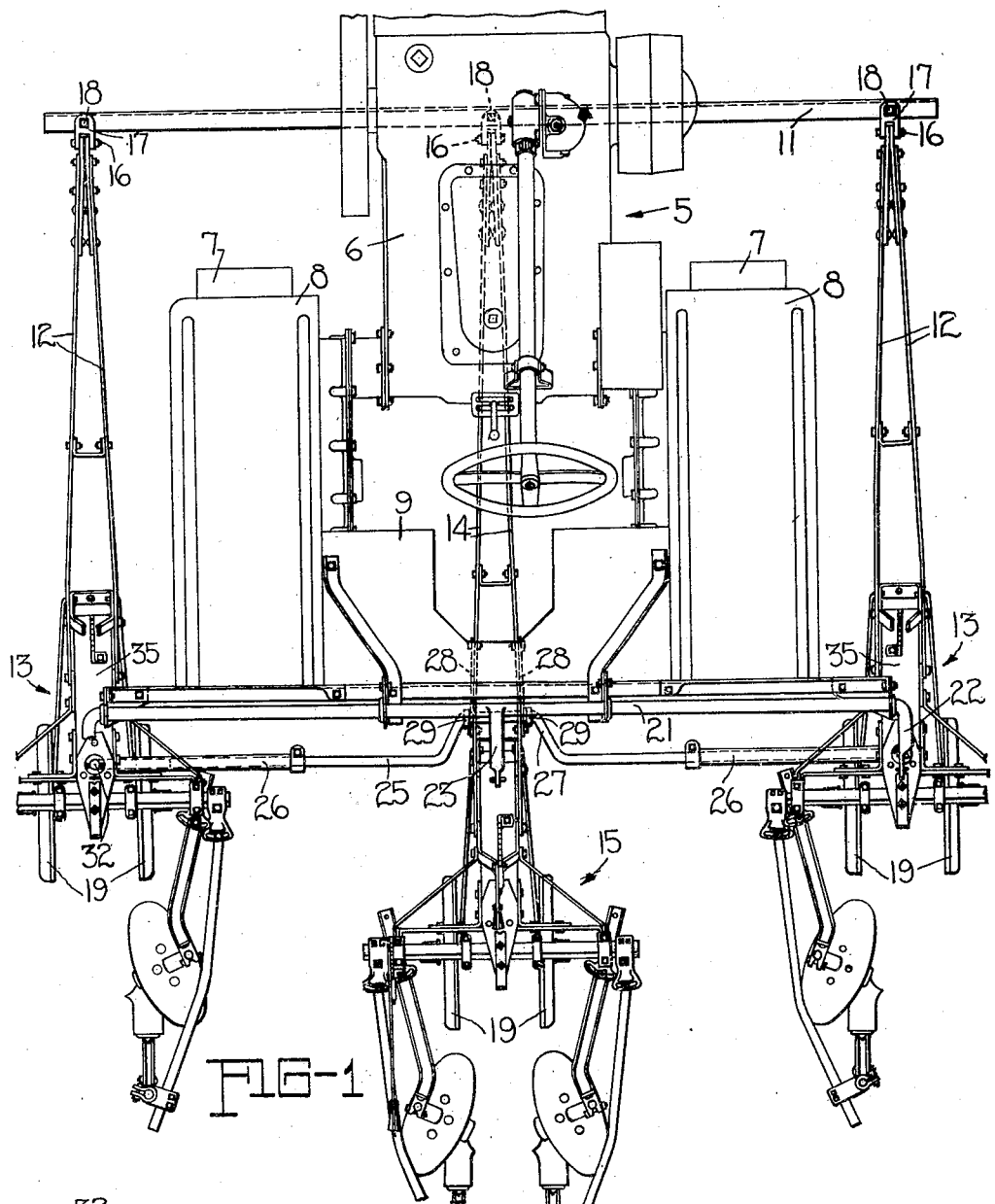
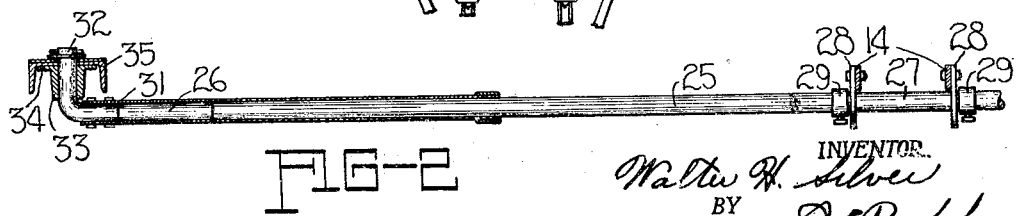

Patented Apr. 19, 1932

1,854,231

UNITED STATES PATENT OFFICE

WALTER H. SILVER, OF MOLINE, ILLINOIS, ASSIGNOR TO DEERE & COMPANY, OF MOLINE, ILLINOIS, A CORPORATION OF ILLINOIS

LISTER CULTIVATOR

Application filed July 24, 1931. Serial No. 552,826.

My invention relates to a multi-row lister cultivator and more particularly to a means for stabilizing the individual cultivating units against lateral tilting.

In the operation of a multiple row lister cultivator the cultivating units or rigs are spaced laterally from each other so that each rig aligns with a listed plant row which was formed by a previous operation with a lister planter. The front end of the draft frame of each cultivating rig is connected to a transverse bar in such a manner that each rig may pivot about its connection so as to follow any lateral or vertical deviation in the listed plant row.

To enable the lister cultivator to operate properly it is necessary that the rigs be maintained in an upright and stable position. The main object of my invention is to provide a novel and improved stabilizing means for a multi-row lister cultivator that will maintain each rig in an upright and stable position and at the same time permit sufficient flexibility for each cultivating rig to follow the lateral and vertical deviations of the listed plant row.

Other objects and advantages of my invention will be apparent to those skilled in the art after a consideration of the following detailed description, taken in conjunction with the accompanying drawings wherein:

Fig. 1 is a top plan view of the rear portion of a conventional tractor having a three-row lister cultivator mounted thereon and embodying my improved stabilizing device; and, Fig. 2 is an enlarged detail view, partly in section, showing one half of the stabilizing bar.

In the precise embodiment of my invention I have shown my improved stabilizing means as applicable to a three-row tractor lister cultivator but the novel features inherent herein are not limited to a tractor cultivator but may also be applied to horse drawn cultivators.

A conventional tractor is indicated by numeral 5 and comprises a body portion 6 supported at the rear end on supporting wheels 7. A fender 8 is mounted over each rear supporting wheel 7 in the usual manner and a platform 9 extends between the fenders and is secured thereto.

A transverse drawbar 11 is secured to the body portion 6 of the tractor and extends laterally from each side thereof a sufficient distance to engage the front ends of the converging draft bars 12 of each of the outer cultivator rigs 13. The draft bars 14 of a central cultivating rig 15 also converge forwardly and are attached to the transverse bar 11 on the longitudinal center line of the tractor. A pivot pin 16 is provided in the front end of each pair of converging draft bars 12 and 14 and each pin engages a pair of ears projecting rearwardly from a clevis 17 aligning therewith and secured to the transverse bar 11 by bolts 18. A pair of supporting wheels 19 are provided at the rear end of each cultivating rig and said wheels contact with the ground when the rigs are in operating position. By reason of the flexible connection between the cultivating rigs and the transverse bar 11 the rigs are free to follow any lateral or vertical deviations in the listed plant row. To prevent the rigs from contacting with each other when shifting laterally, the center rig 15 is offset rearwardly of the outer rigs 13 as is customary with this type of implement.

A transverse rock shaft 21 is provided at the rear end of the tractor and the ends of said rock shaft are bent rearwardly to form lifting arms 22. The lifting arms 22 are aligned with the center line of the respective outer cultivating rigs 13 and a chain or other flexible means extends downwardly from the end of each arm 22 and connects with the frame of the aligning cultivating rig. A similar arm 23 is also secured to the rock shaft intermediate its ends and a chain connects this arm with the frame of the center rig 15 by which same is raised. The rock shaft 21 is supported in bearing brackets secured on the rear end of the tractor and is rocked by any convenient means such as the power take-off of the tractor. When it is desired to raise the cultivating rigs into transport position the rock shaft and lifting arms are actuated and through the chain connections between the lifting arms and rig frames the cultivating rigs are raised about their pivots 16. When the cultivating rigs are lowered into operating position the chains or flexible connections between the arms and the respective rigs hang slack so as not to interfere with the flexibility of the rigs in following the listed plant rows.

For proper operation it is necessary that the cultivating rigs be held in an upright and stable manner and to accomplish this result I have provided an improved telescoping stabilizing bar. The stabilizing bar is disposed transversely between the cultivating rigs and includes a center member 25 and tubular side members 26 aligning therewith. An offset or crank portion 27 is provided intermediate the ends of the center member 25 and this crank portion is supported in stirrups 28 one of which is secured to each of the draft bars 14 of the central cultivating rig 15. The center member 25 of the stabilizing bar is retained against lateral movement with respect to the rig 15 by means of collars 29 secured on the crank portion 27 and contacting with the outer face of each stirrup 28. The ends of the center member 25 are telescopically mounted in the adjacent inner ends of the aligned side sections 26. A stub shaft 31 is secured in the outer end of each side member 26 and each shaft is bent upwardly to form a vertical spindle 32. The vertical spindle 32 of each shaft 31 is journaled in a sleeve 33. A flange 34 is formed on the upper end of each sleeve 33 and by means of which said sleeves are secured to frame members 35 of the respective outer rigs 13.

The stabilizing bar in extending transversely between the cultivating rigs and being connected thereto in the manner described, prevents any one of the rigs from twisting or tilting laterally, hence the rigs are maintained in an upright and stable position. The length of the sleeve 33 on each of the outer cultivating rigs 13 is such that the vertical spindle 32 at each end of the stabilizing bar has sufficient bearing to hold the outer rigs upright. The center rig 15 is restrained from tilting by means of the offset portion 27 of the bar 25 being engaged between the stirrups 28 and the draft bars 14. It is readily apparent from the foregoing description that each cultivating rig is maintained upright through the connection of the stabilizing bar with the other rigs.

With this construction the cultivating rigs are held against tilting while they are free to shift in or out to follow the lateral deviations of the listed plant row. The offset or crank portion 27 enables the rigs to follow vertical deviations in the ground without materially affecting the other rigs.

While I have shown and described in connection with the accompanying drawings the preferred embodiment of the present invention, it is to be understood that my invention is not to be limited to the specific means shown and described, but that in fact, widely different means may be employed in the practice of the broader aspects of my invention.

What I claim and desire to secure by Letters Patent is:—

1. In a three-row lister cultivator comprising a transverse drawbar, laterally spaced cultivating rigs connected at their forward ends to said drawbar, a pair of laterally spaced stirrups secured on the center cultivating rig, a vertical sleeve secured on each outer cultivating rig, a telescoping stabilizing means extending transversely of the cultivating rigs and comprising a center member having an offset crank portion intermediate its ends adapted to be supported in said stirrups, a tubular side member telescopically engaging over each end of the center member and extending laterally therefrom, and a vertical spindle secured to the outer end of each side member and journaled in the sleeve of the adjacent outer rig.

2. In a three-row lister cultivator adapted to be mounted on a tractor, a transverse drawbar secured to the tractor frame and extending laterally from each side thereof, a draft frame for each cultivating rig comprising a pair of forwardly converging bars pivotally attached at their converged front ends to the drawbar, a pair of laterally spaced stirrups secured to the draft frame of the center rig, a vertical sleeve secured on each outer cultivating rig, a rock shaft supported on the tractor, lifting arms fixed to the rock shaft and aligning with the center line of the cultivating rigs, a flexible connection between each arm and its respective cultivating rig, a telescoping stabilizing means extending transversely of the cultivating rigs and comprising a center member having an offset crank portion intermediate its ends adapted to be supported in said stirrups, a tubular side member telescopically engaging over each end of the center member and extending laterally therefrom, and a vertical spindle secured to the outer end of each side member and journaled in the sleeve of the adjacent outer rig.

3. In a lister cultivator comprising a draft member and laterally spaced cultivating rigs connected at their forward ends to said draft member, a vertical sleeve secured on each cultivating rig, a telescoping stabilizing means extending transversely of the cultivating rigs and comprising a center member, a side member telescopically connected with each end of the center member, and a vertical spindle secured to the outer end of each side member and journaled in the sleeve of the adjacent rig.

WALTER H. SILVER.